United States Patent
Pradeep et al.

(10) Patent No.: US 11,734,907 B2
(45) Date of Patent: Aug. 22, 2023

(54) TRACKING VULNERABLE ROAD USERS ACROSS IMAGE FRAMES USING FINGERPRINTS OBTAINED FROM IMAGE ANALYSIS

(71) Applicant: Humanising Autonomy Limited, London (GB)

(72) Inventors: Yazhini Chitra Pradeep, London (GB); Wassim El Youssoufi, London (GB); Dominic Noy, London (GB); James Over Everard, Manningtree (GB); Raunaq Bose, London (GB); Maya Audrey Lara Pindeus, London (GB); Leslie Cees Nooteboom, London (GB)

(73) Assignee: HUMANISING AUTONOMY LIMITED, London (GB)

( * ) Notice: Subject to any disclaimer, the term of this patent is extended or adjusted under 35 U.S.C. 154(b) by 57 days.

(21) Appl. No.: 16/857,645

(22) Filed: Apr. 24, 2020

(65) Prior Publication Data
US 2021/0334982 A1 Oct. 28, 2021

(51) Int. Cl.
*G06V 10/25* (2022.01)
*G06T 7/20* (2017.01)
*G06V 10/764* (2022.01)
*G06V 10/82* (2022.01)
(Continued)

(52) U.S. Cl.
CPC .............. *G06V 10/25* (2022.01); *G06T 7/20* (2013.01); *G06V 10/40* (2022.01); *G06V 10/764* (2022.01); *G06V 10/82* (2022.01); *G06V 20/58* (2022.01); *G06T 2207/10016* (2013.01); *G06T 2207/20081* (2013.01); *G06T 2207/30196* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2010/0008540 A1* | 1/2010 | Shet | G06V 40/103 382/103 |
| 2019/0258878 A1 | 8/2019 | Koivisto et al. | |
| 2021/0141863 A1* | 5/2021 | Wu | G06N 3/0454 |

(Continued)

OTHER PUBLICATIONS

International Search Report and Written Opinion, Patent Cooperation Treaty Application No. PCT/IB2021/000139, dated Jun. 16, 2021, 15 pages.

(Continued)

*Primary Examiner* — Vikkram Bali
(74) *Attorney, Agent, or Firm* — Fenwick & West LLP

(57) ABSTRACT

Systems and methods are disclosed herein for tracking a vulnerable road user (VRU) regardless of occlusion. In an embodiment, the system captures a series of images including the VRU, and inputs each of the images into a detection model. The system receives a bounding box for each of the series of images of the VRU as output from the detection model. The system inputs each bounding box into a multi-task model, and receives as output from the multi-task model an embedding for each bounding box. The system determines, using the embeddings for each bounding box across the series of images, an indication of which of the embeddings correspond to the VRU.

17 Claims, 5 Drawing Sheets

(51) Int. Cl.
  *G06V 10/40*  (2022.01)
  *G06V 20/58*  (2022.01)

(56) References Cited

U.S. PATENT DOCUMENTS

| | | | |
|---|---|---|---|
| 2021/0156963 A1* | 5/2021 | Popov | G01S 7/417 |
| 2021/0201052 A1* | 7/2021 | Ranga | G06K 9/00369 |
| 2021/0286989 A1* | 9/2021 | Zhong | G06N 20/00 |

OTHER PUBLICATIONS

Li, X. et al., "A Unified Framework for Concurrent Pedestrian and Cyclist Detection," IEEE Transactions on Intelligent Transportation Systems, IEEE, Piscataway, NJ, USA, vol. 18, No. 2, Feb. 2017, pp. 269-281.

Saleh, K. et al., "Early intent prediction of vulnerable road users from visual attributes using multi-task learning network," 2017 IEEE International Conference on Systems, Man, and Cybernetics (SMC), IEEE, Oct. 2017, pp. 3367-3372.

\* cited by examiner

TRACKING VULNERABLE ROAD USERS ACROSS IMAGE FRAMES USING FINGERPRINTS OBTAINED FROM IMAGE ANALYSIS

BACKGROUND

This disclosure relates generally to intelligent road vehicle applications, and more specifically relates to tracking vulnerable road users from frame-to-frame.

Autonomous vehicles attempt to track pedestrians over time; however, when a pedestrian is occluded in a set of intermediate frames of the video (e.g., because a user walks behind an object or a car drives past a pedestrian, or another pedestrian passes the user), tracking the pedestrian across frames may be difficult or impossible. When tracking fails, existing systems may assume that when a pedestrian re-enters the frame, following occlusion, that the pedestrian is a new person that was not observed in a prior frame. If this happens, previously observed information and predictions made for the pedestrian are lost. This results in suboptimal predictions of how a pedestrian may act, which may result in inaccurate, inefficient, or unsafe activity of an autonomous vehicle.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION (a) Overview

Systems and methods are disclosed herein for tracking a vulnerable road user ("VRU") over time regardless of whether occlusion occurs. In order to overcome the occlusion problem, a multi-task machine learning model is trained to combine multiple encoders, each of which is trained to predict activity of a VRU. Cropped bounding box images are input into the machine learning model, and a fingerprint of the VRU is output, optionally along with additional information. By combining the multiple encoders into the machine learning model, a high degree of confidence is achieved across frames that a same individual is tracked, even where partial or complete occlusion occurs.

(b) Capturing Images of VRUs

Figure 1:
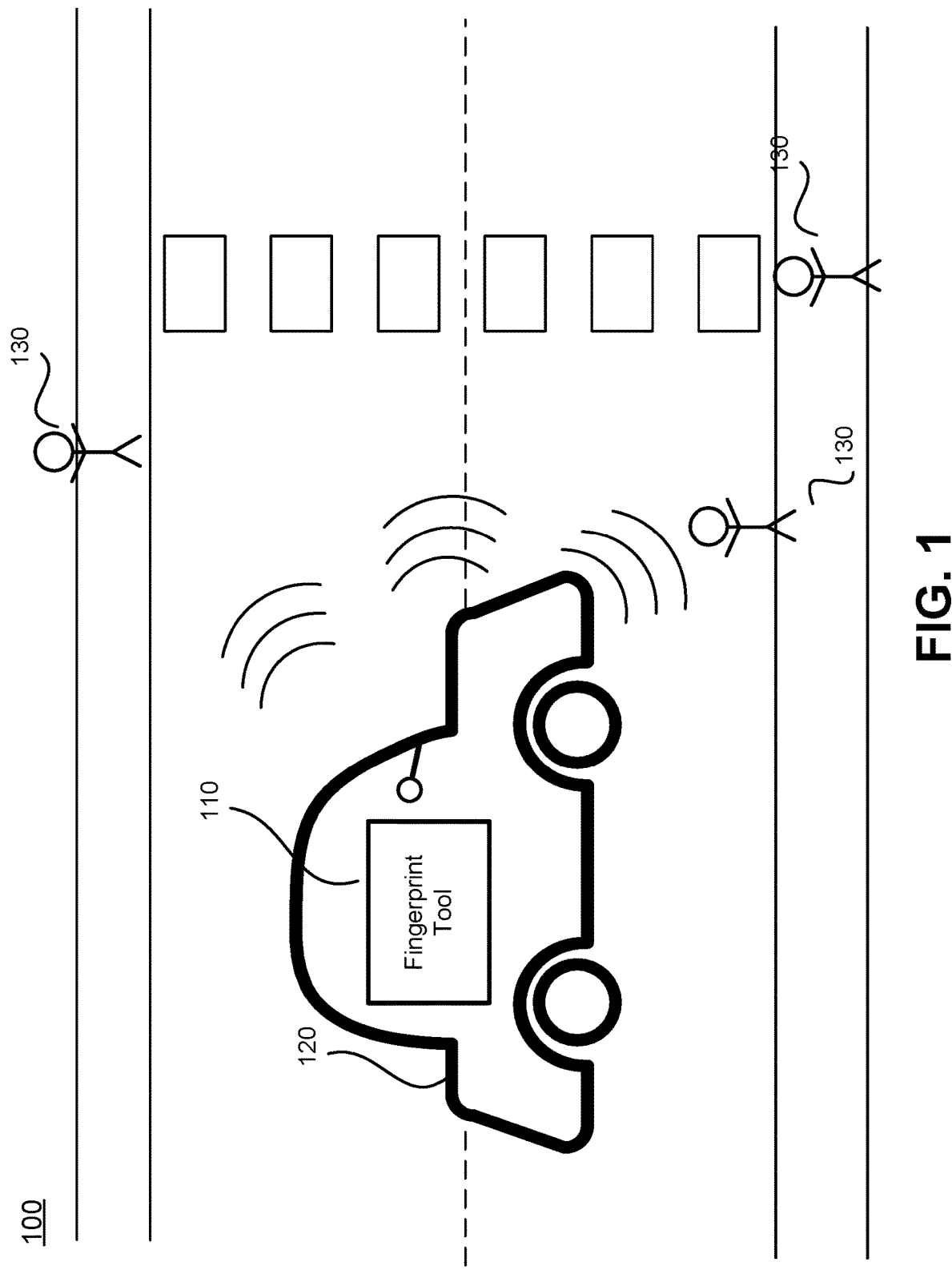
FIG. 1 depicts one embodiment of a vehicle including a fingerprint tool for tracking vulnerable road users before and after occlusion.

FIG. 1 depicts one embodiment of a vehicle including a fingerprint tool for tracking vulnerable road users before and after occlusion. Environment 100 includes fingerprint tool 110, which is depicted as part of vehicle 120. Vehicle 120 may be an autonomous, semi-autonomous, or non-autonomous vehicle. VRUs 130 are depicted throughout environment 100. The term VRU, as used herein, refers not only to pedestrians, but also to human beings on micro-mobility vehicles such as bicycles or scooters or wheelchairs (and similar), and companions to human beings, such as dogs and other pets. Vehicle 120 is equipped with one or more camera sensors, Camera sensors, as used herein, capture images over time. The images may be picture images, and may be include, or separately produce, images showing other sensory input such as depth and/or thermal information. The images may be captured periodically, based on a certain amount of time passing, or based on some other event, such as vehicle 120 having traveled a certain amount of distance since the last time an image was taken. The images, taken together, may form a video (e.g., a high-resolution video); in this context, the images are occasionally referred to as "frames" herein. The images from multiple camera sensors taken at a same time may be stitched together (e.g., to form panoramic or 360-degree images), or may be used as standalone images. Vehicle 120 may also be equipped with other sensors that provide auxiliary information in connection with the images from the camera sensor(s). Exemplary sensors include a global positioning system (GPS) sensor, and an inertial measurement unit (IMU) sensor, though any sensor for measuring any type of information may be included.

Fingerprint tool 110 receives the images, generates a fingerprint of each VRU 130, and tracks VRUs 130 over time. The term fingerprint, as used herein, refers to an anonymous representation of a VRU that is used to track the VRU's actions until such a time that the VRU leaves the periphery of the camera sensors of vehicle 120. Structural details of what a fingerprint includes are discussed in further detail with reference to FIGS. 3 and 4. Fingerprint tool 110 tracks each of VRUs 130 regardless of whether the VRUs are occluded, in part or in full, by another object or another VRU. The details of how fingerprint tool 110 functions are described in further detail with reference to FIG. 3 below. Fingerprint tool 110 may feed output to other tools of vehicle 120, which may result in certain functionality, such as modified autonomous driving behavior, an alert to a driver of vehicle 120, data for processing by a dash cam, and so on. Fingerprint tool 110 is depicted as being installed in vehicle 120, but may be installed, in whole or in part, on a remote server, where vehicle 120 communicates with the remote server to pass along images, and to receive the outputs of fingerprint tool 110. In an embodiment, fingerprint tool 110 may be entirely incorporated into a cloud context, to perform post-event evaluation of VRU behavior and accident detection (e.g., for insurance or fleet management purposes). In such an embodiment, sensor data is sent to the cloud context for processing in manners similar to those described herein.

(c) Exemplary Pre-Processing of Images

Figure 2:
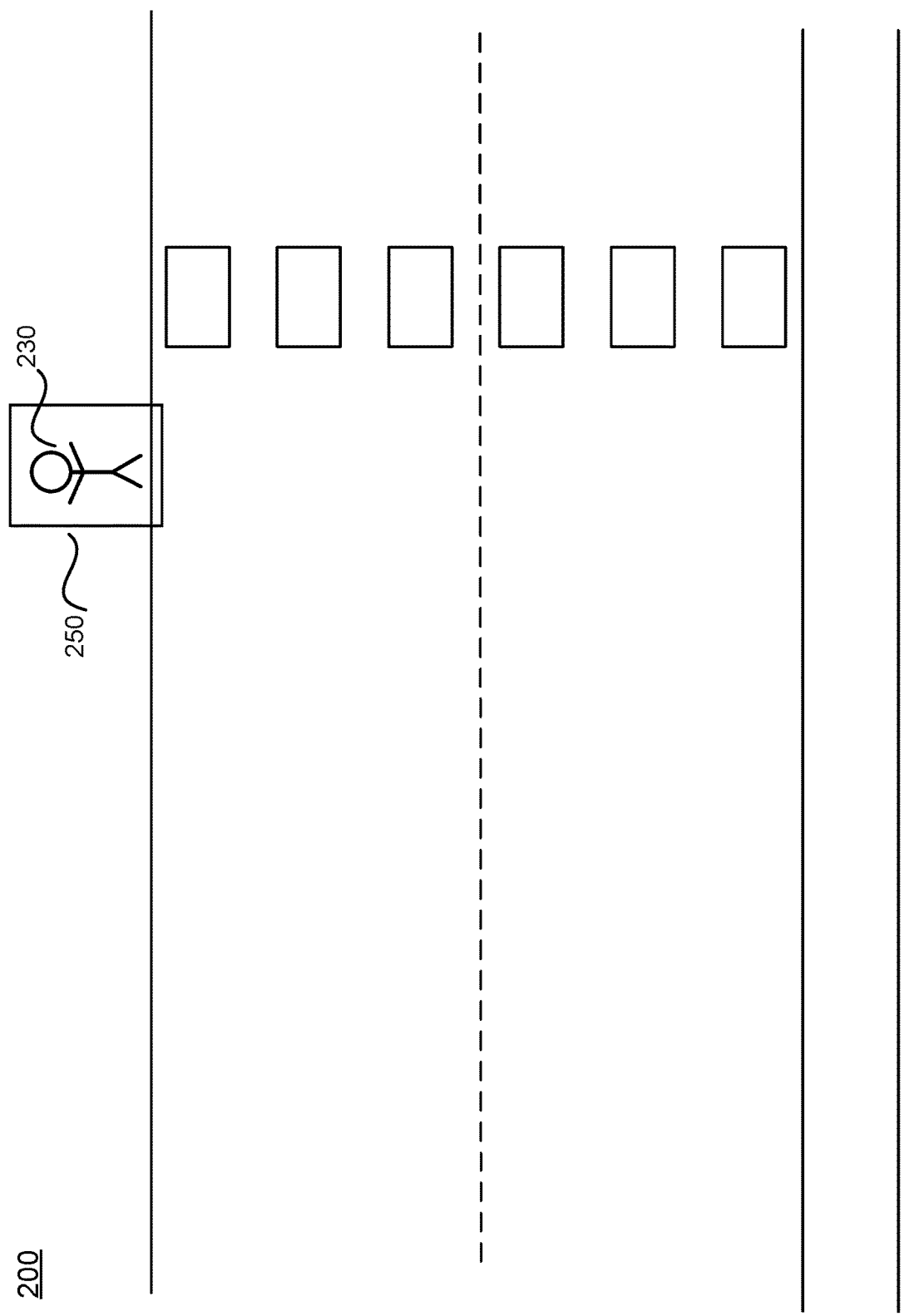
FIG. 2 depicts one embodiment of an image that may be preprocessed prior to being used by the fingerprint tool.

FIG. 2 depicts one embodiment of an image that may be preprocessed prior to being used by the fingerprint tool. Image 200 represents a frame, such as a full frame of a video captured by image sensors of vehicle 120. In an embodiment, image 200 is fed in its entirety as input into fingerprint tool 110 for processing. In an embodiment, fingerprint tool 110 preprocesses image 200 by executing a detection model, which detects one or more VRUs 230 in image 200, and responsively applies a bounding box. To preprocess image 200, fingerprint tool 110 may crop the one or more VRUs 230 into cropped portion(s) 250, and use the one or more cropped portion(s) 250 as input into an encoder, such as one or more shared layers of a fingerprint extraction module described below with reference to FIG. 3. Additionally, fingerprint tool 110 may determine the coordinates of each bounding box for input into a tracking module. In an embodiment, as will be described below with respect to FIG. 3 below, both image 200 and cropped portions 250 may be used as input into a tracking module. Using cropped portion(s) 250 as input to the encoder offers an advantage to using full images, as non-cropped parts of the full images may include noise that is not informative as to activity of the VRU. Moreover, running the encoder, which is processor-intensive, on relevant bounding box data to the exclusion of the full image increases accuracy, and reduces latency and general processing unit (GPU) footprint. Processing by the encoder and tracking module, as well outputs of the tracking model, are discussed in further detail below with reference to FIGS. 3-4.

(d) Fingerprint Tool Functionality

Figure 3:
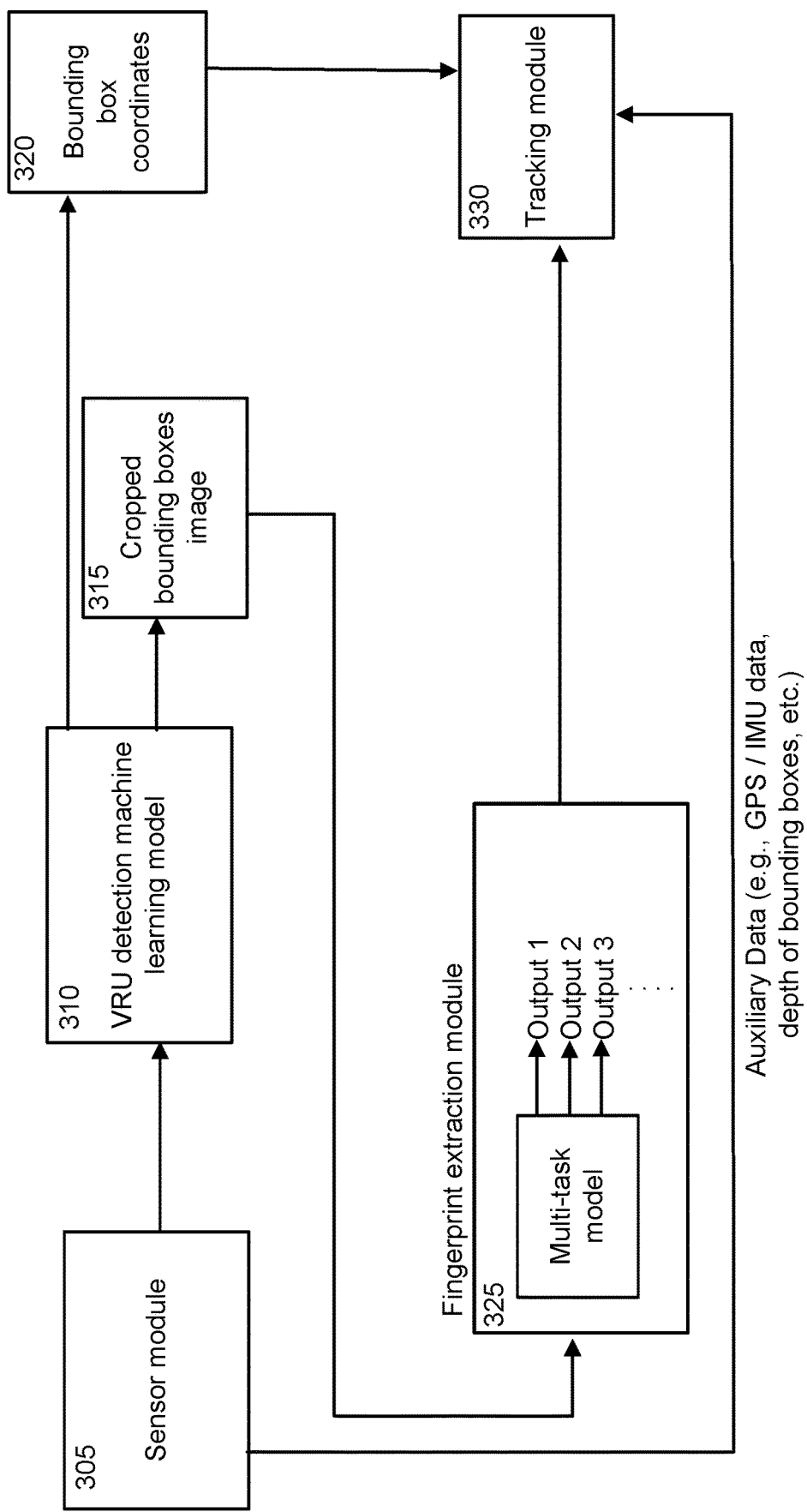
FIG. 3 depicts one embodiment of exemplary modules executed by the fingerprint tool and a data flow therethrough.

FIG. 3 depicts one embodiment of exemplary modules executed by the fingerprint tool and a data flow therethrough. Sensor module 305 receives sensor data captured by vehicle 120, such as images and auxiliary data like GPS and IMU data. Sensor module 305 passes the images to VRU detection machine learning model 310, and passes the auxiliary data (e.g., GPS and IMU data, depth data, thermal data, etc.) to tracking module 330. VRU detection machine learning model 310 pre-processes the images and outputs cropped bounding box images 315 and/or bounding box coordinates 320, as was discussed with reference to FIG. 2. To achieve this end, the VRU detection machine learning model 310 is trained to detect one or more VRUs in the image, and to output a cropped bounding box of each VRU detected in the image and/or the coordinates of where bounding boxes would be applied in the context of the image. Images may be pre-processed in real-time or near-real-time as live video is received, and frames are taken therefrom. In an embodiment where video is processed after an event has occurred, such as post-processing on a cloud platform, images may be pre-processed in faster than real time (e.g., a video can be analyzed in less time than the length of the video itself).

Fingerprint extraction module 325 generates a fingerprint of each VRU depicted in each bounding box of the image. To do this, fingerprint extraction module 325 feeds, as input to a multi-task model, each cropped bounding box 315 that is received as output from VRU detection machine learning model 310. The multi-task model is a multi-task neural network with branches that are each trained to determine different parameters about a VRU, and its particulars are discussed in further detail with reference to FIG. 4. The multi-task model outputs a fingerprint for each bounding box in the image. In an embodiment, each fingerprint comprises an embedding (i.e., a vector in latent space containing data that is characteristic of the bounding box), and is output or derived from an intermediate layer of the multitask neural network, which acts as an encoder. Further details of this embedding are described below with respect to FIG. 4. Fingerprint extraction module 325 may store each of the fingerprints to memory.

Tracking model 330 obtains the fingerprints generated by fingerprint extraction module 325 from the memory (or receives them directly as output of fingerprint extraction module 325), and determines therefrom which fingerprints represent the same entity (that is, which bounding boxes contain the same person across different ones of the images). Tracking module 330 may also receive auxiliary data, such as GPS data, IMU data, image depth data and/or thermal data (or partial image depth data and/or thermal data indicating depth/thermal data for each bounding box), and any other auxiliary data, from sensor module 305. In an embodiment, tracking module 330 performs this determination by using an unsupervised learning model, such as a clustering algorithm. Exemplary clustering algorithms include a nearest neighbor clustering algorithm on a set of data as well as centroid, density, and hierarchical algorithms. Soft clustering may be used as well, for example, using an expectation-maximization algorithm to compute maximum likelihood or maximum a posteriori estimates to obtain the parameters of the model (e.g., Gaussian mixture module). A Bayesian inference may be used to perform soft clustering in order to receive as output an uncertainty value (described further below). An expectation-maximization algorithm may also, or alternatively, use Bayesian inference to obtain the maximum likelihood (MLE) and the maximum a posteriori estimates (MAP). A full Bayesian inference may be used to obtain a distribution over the parameters and latent variables of the Gaussian mixture module to obtain a better understanding of model fit and uncertainty. The set of data may include each of the fingerprints, across each of the images and each of the bounding boxes obtained therefrom, in a given session, a session being an amount of time of operation (e.g., the last ten minutes, the last ten seconds, since a car was turned on, since a given VRU was detected, etc.). In another embodiment, the set of data includes fingerprints obtained across sessions, where those sessions may be from a same vehicle 120, or from images derived from different vehicles 120. In either case, the set of data may also include the auxiliary data. The memory to which fingerprint extraction module 302 stores the fingerprints may be purged at the end of a session, or may be maintained for any prescribed amount of time, and may optionally be stored with auxiliary data, such as GPS data (which will improve tracking across sessions).

Tracking module 330 identifies, as a result of the clustering algorithm, clusters of embeddings, where each cluster has the embedding corresponding to the bounding box of a particular person through the frames. Thus, tracking module 330 determines whether a user is a same user across various frames, despite occlusions, based on a fingerprint having an embedding within a given cluster. Tracking module 330 may apply a set of logical rules to the clustering. For example, tracking module 330 may prevent the clustering of two vectors corresponding to bounding boxes that appear in the same frame, as the same person cannot exist twice in a single frame.

Tracking module 330 may output, in addition to a determination that a bounding box includes a same person across frames, a certainty score associated with its determination. That is, a probability that its determination that this is a same person across frames is true. To determine the certainty score, tracking module 330 may apply a probabilistic clustering algorithm (e.g., a soft clustering) to each cluster to determine the probability that the person belongs to a given cluster. For example, a Gaussian Mixture Model (GMM) may be used as the soft clustering algorithm, where a latent variable is assigned to each data point. The latent variables each represent that the probability that a given observed data point belongs to a given cluster component (that is, the particular component of the GMM). By fitting a GMM to the embeddings, tracking module 330 may obtain for each new observation the probability of belonging to the same embedding. Tracking module 330 may assign, or derive, the certainty score using the probability.

(e) Exemplary Multi-Task Model for Fingerprint Tool

Figure 4:
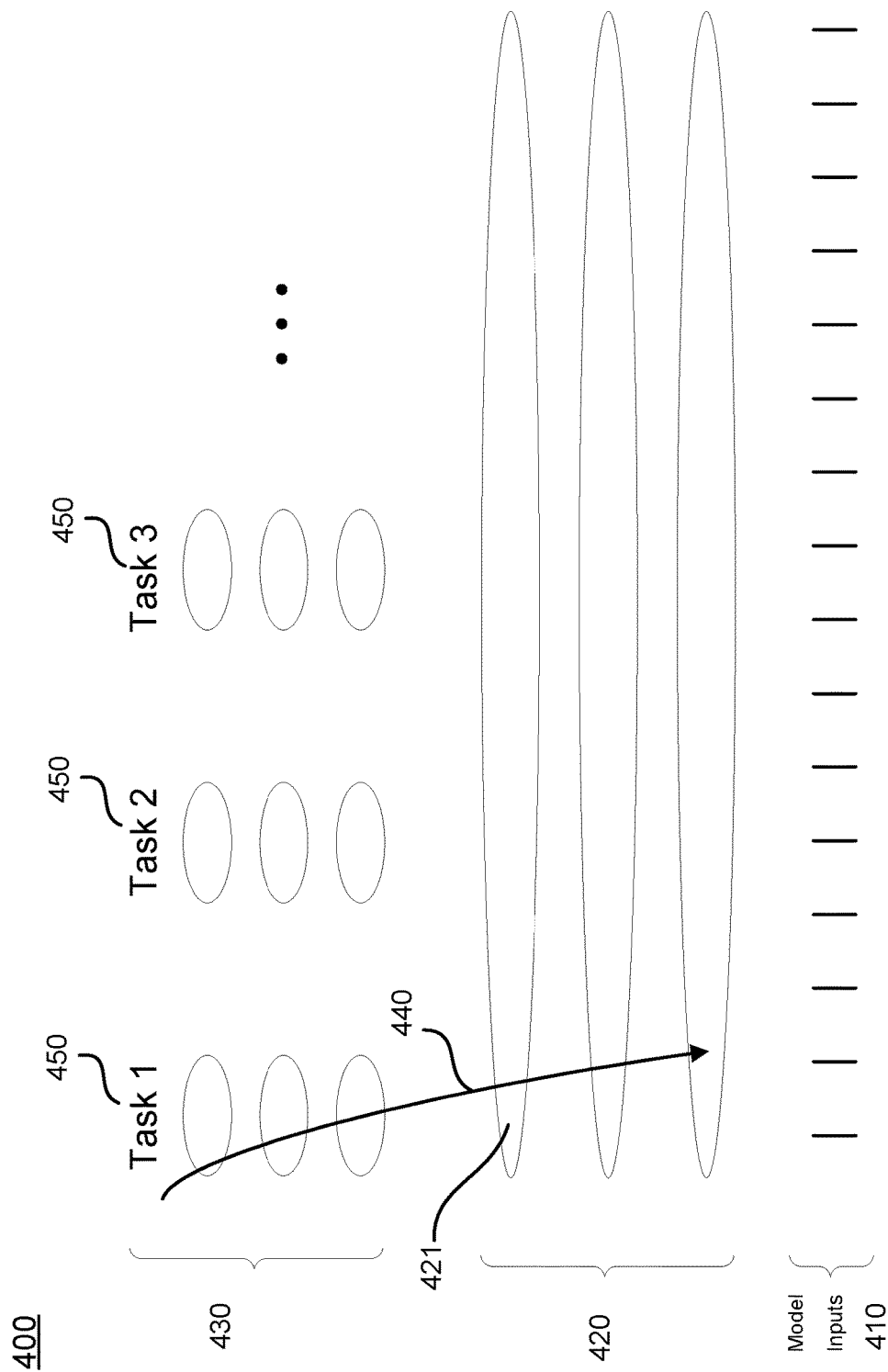
FIG. 4 depicts one embodiment of a neural network model for extracting a fingerprint from an image.

FIG. 4 depicts one embodiment of a neural network model for extracting a fingerprint from an image. Multi-task model 400 is an exemplary representation of multi-task model 312. Multi-task model 400 may be initialized based on a trigger. Exemplary triggers include ignition of vehicle 120, a VRU being detected in an image after a threshold amount of time had passed since the last time a VRU was detected, and the like. Following initialization, model inputs 410 are received by model 400. The structure of the multi-task model has a set of shared layers 420 and a plurality of branching task-specific layers 430, each branch of the branching task-specific layers 430 corresponding to a task 450. The tasks 450 are related within the domain, meaning that each of the tasks 450 predicts activity that are predictable based on a highly overlapping information space. For example, in predicting attributes of a pedestrian for use by an autonomous transportation system, the different tasks 450 may predict activities such as whether the pedestrian is aware of the vehicle, whether the pedestrian is looking at a phone, whether the pedestrian is an adult, and so on. As such, when trained, the shared layers 420 produce information that is useful for performing each of tasks 450 and outputting each of these predictions.

To train multi-task model 400, training examples include labels associated with the tasks 450. Each training example includes a label for a branching task. In the context of a neural network, during training, the training examples are sampled, and for each sample a backpropagation algorithm may be performed to update 440 the task-specific layers 430 corresponding to the sampled example and the shared layers 420, though in non-neural-network implementations, back-propagation need not be used. Where back-propagation is used, the shared layers may be updated through backpropagation by a sample having a label for each of tasks 450. However, in use by fingerprint extraction module 302, model 400 is not used to perform the tasks that is has been trained to perform (that is, predict what it was trained to predict). Rather, the shared layers 420 have become good at converting the input (that is, the pixel information from the bounding boxes) into a set of information useful for the task-specific layers 430 to make the task-specific predictions. As such, the last layer 420 (or one of the later layers) of shared layers 420, when a particular bounding box is input, produces a set of information at the neurons of that layer that contains information that is highly relevant in the domain of the set of tasks. This does not preclude the branches or the encoder (that is, the shared layers) from performing predictions as they are trained to do so (for example, the encoder/shared layers themselves may be used to detect whether a person is looking at a vehicle or not, and a VRU's intention to perform an activity may be determined by a trained branch corresponding to that activity).

Given the relevance of last layer 420, rather than use multi-task model 400 to make a prediction as it was trained to do, fingerprint extraction module 302 feeds in the pixel data from the bounding box into model 400 and then takes the values of last layer 420 (or one of the later layers) and stores that as an embedding for the bounding box. This embedding is a fingerprint, containing characteristic information about the contents of the bounding box that is relevant in the context of the tasks for which that model was trained. The dimensions of each embedding have no meaning, but the general direction of the embedding in latent space has meaning. Thus, as described with reference to FIG. 3, the embeddings are compared in a clustering algorithm to see how similar they are within the context of the set of tasks for which multi-task model 400 was trained to perform.

(f) Exemplary Process of Using Fingerprint Tool

Figure 5:
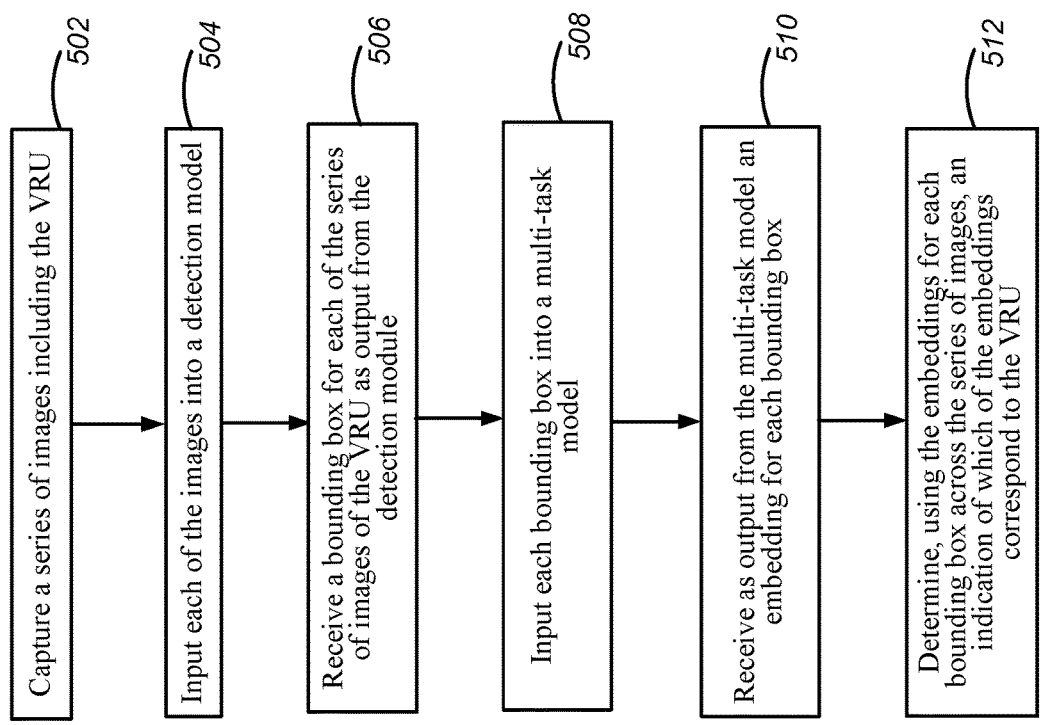
FIG. 5 depicts an exemplary flowchart of a process for using a fingerprint tool.

FIG. 5 depicts an exemplary flowchart of a process for using a fingerprint tool. Process 500 begins with a fingerprint tool (e.g., fingerprint tool 110) capturing 502 images including a VRU (e.g., VRU 130). The images may be frames of a video. Capturing may be performed by cameras of fingerprint tool 110, or may be performed by receiving images from camera sensors installed on vehicle 120 (e.g., where fingerprint tool 110 is decoupled from the camera sensors, or where fingerprint tool 110 is in part, or in whole, operating in a cloud environment), or a combination of both. Sensor module 305 may capture the images along with auxiliary data.

Fingerprint tool 110 inputs 504 each of the images into a detection model (e.g., VRU detection machine learning model 310). Fingerprint 110 receives 506 a bounding box for each of the series of images of the VRU as output from the detection module. Where multiple VRUs are present in the image, multiple bounding boxes may be received for that image. The detection module may also output bounding box coordinates (e.g., bounding box coordinates 320 for use by tracking module 330). Fingerprint tool 110 inputs 508 each bounding box into a multi-task model (e.g., multi-task model 325), and receives 510 as output from the multi-task model an embedding for each bounding box.

Fingerprint tool 110 determines 512, using the embeddings for each bounding box across the series of images, an indication of which of the embeddings correspond to the VRU. For example, a clustering algorithm may be used, as discussed above, to determine to which cluster each given embedding corresponds, each cluster being representative of a different VRU. Thus, despite occlusion, fingerprint tool 110 may resolve whether a detected VRU is a same VRU or a different VRU from one captured in a prior frame. Advantageously, in a scenario where embeddings are tracked over time, this enables knowledge of whether a VRU that is encountered by vehicle 120 is a same VRU that has been encountered before, all the while maintaining that VRU's anonymity. This may feed back to other systems, such as a reporting or alert system, an autonomous vehicle drive mechanism, and others, where predictions for that particular VRU are influenced by that individual's past behavior. Other data may play into VRU identification by fingerprint tool 110, such as auxiliary data received that corresponds to the frame. Confidence scores that a given embedding corresponds to its indicated cluster may be output by the clustering algorithm as well, indicating how confident fingerprint tool 110 is that the VRU detected in a bounding box is a given known VRU.

(g) Summary

Model 400 may sit on a general processing unit (GPU) used for a perception stack of an autonomous vehicle, or the GPU of an ADAS system, either integrated into the vehicle, or added as a retrofit solution. Model 400 may also be integrated in telematics and fleet management solutions such as mobile phones or purpose-built dashcams. Alternatively, model 400 may run on a cloud-based server where model 400 analyzes data post-event, rather than in real time.

Advantageously, VRUs are tracked using the techniques discussed herein without assigning an identity to the tracked VRUs. Thus, automotive, robotics, infrastructure, logistics, security, retail industries, and the like can interface with model 400 to enable individual interactions with people based on their fingerprint. Model 400 may also allow for more accurate high-level understanding of behavior, as model 400 can observe VRUs behavior change over time with more confidence. Thus, explainability and reliability of predictive models is achieved, which results in safer and more efficient driving and operation of vehicles.

Additionally, the outputting of a level of confidence from the models allows for an understanding of uncertainty of the perception. In practice, this allows a perception stack of a vehicle to understand whether it can rely on the incoming information. This aids both transparency in understanding of decisions and the creation of fail-safe processes such as deciding to rely only on depth sensor data when confidence in a camera of vehicle 120 is very low due to the presence of many occlusions (e.g., a train is passing by that obscures many VRUs).

Additional applications where the disclosed systems and methods may be incorporated include an infrastructure-based analysis application (e.g., in road or train platforms), in-vehicle movement of people (e.g., where persons are at risk based on their movement within a bus or a train), and cloud-based analysis of data that has been captured in these and similar situations. Intelligent road vehicles, as used herein, refers to robotics and delivery robots as well, even where those robots are not specifically on a road (e.g., where robots in a packaging warehouse are operating near vulnerable people).

The disclosed embodiments use one or more sub-layers of a multi-task model (e.g., multi-headed encoder) for storing meaningful information about a VRU (that is, a fingerprint) in latent space. However, alternative implementations are within the scope of this disclosure as well. For example, auto-encoders, such as variational auto-encoders may be used to store the fingerprint of a VRU. A variational auto-encoder may act as the backbone of the multi-task models described herein having different branches with different task heads. In an embodiment, an autoencoder compresses data by representing it on a latent space with fewer dimensions than the compressed data originally had. The learned latent variables of the auto-encoder may be used as a fingerprint. Where a variational auto-encoder is used, latent variables may be represented as probability distributions with particular parameters. Tracking module 330 may compare different images to identify whether a same VRU is within them by comparing their latent probability distributions and identifying same VRUs based on how well those distributions match.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for tracking a vulnerable road user (VRU) regardless of occlusion, the method comprising:

capturing a series of images comprising a plurality of human VRUs including the VRU, the VRU at least partially occluded in at least some images of the series of images;

inputting each of the images into a detection model;

receiving a bounding box for each of the series of images of the VRU as output from the detection model;

inputting each bounding box into a multi-task model;

receiving as output from the multi-task model an embedding for each bounding box, the embedding produced from a shared layer of the multi-task model, the multi-task model comprising the shared layer and a plurality of branches each trained to predict a different activity, wherein the shared layer is trained using backpropagation from the plurality of branches; and determining, using the embeddings for each bounding box across the series of images, an indication of which of the embeddings correspond to the VRU as opposed to a different VRU of the plurality of human VRUs despite the partial occlusion of the VRU, wherein determining the indication of which of the embeddings correspond to the VRU comprises:

inputting each embedding into an unsupervised learning model; and receiving as output, from the unsupervised learning model, an indication of a cluster of embeddings to which each embedding corresponds, each cluster corresponding to a different VRU of the plurality of human VRUs.

2. The method of claim 1, wherein capturing the series of images comprises receiving images captured by a camera installed on a vehicle, and wherein auxiliary data captured by sensors installed on the vehicle is received with the images.

3. The method of claim 2, further comprising:
receiving coordinates in a context of each of the series of images of each bounding box, wherein determining the indication of which of the embeddings correspond to the VRU comprises using the coordinates in addition to the embeddings.

4. The method of claim 3, wherein determining the indication of which of the embeddings correspond to the VRU further comprises using the auxiliary data.

5. The method of claim 1, wherein each embedding acts as a fingerprint that tracks the VRU without assigning an identity to the VRU.

6. The method of claim 1, wherein determining the indication of which of the embeddings correspond to the VRU further comprises receiving, as part of the output, a confidence score corresponding to a confidence that each given embedding corresponds to its indicated cluster.

7. A non-transitory computer-readable medium comprising memory with instructions encoded thereon for tracking a vulnerable road user (VRU) regardless of occlusion, the instructions causing one or more processors to perform operations when executed, the instructions comprising instructions to:
capture a series of images comprising a plurality of human VRUs including the VRU, the VRU at least partially occluded in at least some images of the series of images;
input each of the images into a detection model;
receive a bounding box for each of the series of images of the VRU as output from the detection model;
input each bounding box into a multi-task model;
receive as output from the multi-task model an embedding for each bounding box, the embedding produced from a shared layer of the multi-task model, the multi-task model comprising the shared layer and a plurality of branches each trained to predict a different activity, wherein the shared layer is trained using backpropagation from the plurality of branches; and
determine, using the embeddings for each bounding box across the series of images, an indication of which of the embeddings correspond to the VRU as opposed to a different VRU of the plurality of human VRUs despite the partial occlusion of the VRU, wherein determining the indication of which of the embeddings correspond to the VRU comprises:
inputting each embedding into an unsupervised learning model; and
receiving as output, from the unsupervised learning model, an indication of a cluster of embeddings to which each embedding corresponds, each cluster corresponding to a different VRU of the plurality of human VRUs.

8. The non-transitory computer-readable medium of claim 7, wherein the instructions to capture the series of images comprise instructions to receive images captured by a camera installed on a vehicle, and wherein auxiliary data captured by sensors installed on the vehicle is received with the images.

9. The non-transitory computer-readable medium of claim 8, wherein the instructions further comprise instructions to:
receive coordinates in a context of each of the series of images of each bounding box, wherein determining the indication of which of the embeddings correspond to the VRU comprises using the coordinates in addition to the embeddings.

10. The non-transitory computer-readable medium of claim 9, wherein determining the indication of which of the embeddings correspond to the VRU further comprises using the auxiliary data.

11. The non-transitory computer-readable medium of claim 7, wherein each embedding acts as a fingerprint that tracks the VRU without assigning an identity to the VRU.

12. The non-transitory computer-readable medium of claim 7, wherein the instructions to determine the indication of which of the embeddings correspond to the VRU further comprise instructions to receive, as part of the output, a confidence score corresponding to a confidence that each given embedding corresponds to its indicated cluster.

13. A system for tracking a vulnerable road user (VRU) regardless of occlusion, the system comprising:
a non-transitory computer-readable medium comprising memory with instructions encoded thereon; and
one or more processors that, when executing the instructions, are caused to perform operations, the operations comprising:
capturing a series of images comprising a plurality of human VRUs including the VRU, the VRU at least partially occluded in at least some images of the series of images;
inputting each of the images into a detection model;
receiving a bounding box for each of the series of images of the VRU as output from the detection model;
inputting each bounding box into a multi-task model;
receiving as output from the multi-task model an embedding for each bounding box, the embedding produced from a shared layer of the multi-task model, the multi-task model comprising the shared layer and a plurality of branches each trained to predict a different activity, wherein the shared layer is trained using backpropagation from the plurality of branches; and
determining, using the embeddings for each bounding box across the series of images, an indication of which of the embeddings correspond to the VRU as opposed to a different VRU of the plurality of human VRUs despite the partial occlusion of the VRU, wherein determining the indication of which of the embeddings correspond to the VRU comprises:
inputting each embedding into an unsupervised learning model; and
receiving as output, from the unsupervised learning model, an indication of a cluster of embeddings to which each embedding corresponds, each cluster corresponding to a different VRU of the plurality of human VRUs.

14. The system of claim 13, wherein capturing the series of images comprises receiving images captured by a camera installed on a vehicle, and wherein auxiliary data captured by sensors installed on the vehicle is received with the images.

15. The system of claim 14, further comprising:
receiving coordinates in a context of each of the series of images of each bounding box, wherein determining the indication of which of the embeddings correspond to the VRU comprises using the coordinates in addition to the embeddings.

16. The system of claim 15, wherein determining the indication of which of the embeddings correspond to the VRU further comprises using the auxiliary data.

17. The system of claim 13, wherein each embedding acts as a fingerprint that tracks the VRU without assigning an identity to the VRU.

* * * * *